United States Patent [19]
Pfost

[11] 3,965,813
[45] June 29, 1976

[54] ARRANGEMENT FOR THE ATTACHMENT OF A BODY TO A SUPPORT

[75] Inventor: Karl Pfost, Schanbach, Germany

[73] Assignee: Fritz Muller, Neckar, Germany

[22] Filed: May 7, 1975

[21] Appl. No.: 575,427

[30] Foreign Application Priority Data
May 16, 1974 Germany............................ 2423862
Mar. 27, 1975 Germany............................ 2513708

[52] U.S. Cl.................................. 100/99; 72/446; 83/698; 100/DIG.18; 403/321
[51] Int. Cl.².......................................... B30B 15/00
[58] Field of Search................ 100/99, 295, DIG.18, 100/229 R, 224; 72/448, 446; 83/698; 403/321, 322, 323

[56] References Cited
UNITED STATES PATENTS
| | | | |
|---|---|---|---|
| 3,027,793 | 4/1962 | Sommer...................... | 100/DIG. 18 |
| 3,101,639 | 8/1963 | Cederleaf............................. | 83/698 |
| 3,111,895 | 11/1963 | Kraft et al.................... | 100/DIG. 18 |

Primary Examiner—Billy J. Wilhite
Attorney, Agent, or Firm—Roylance, Abrams, Berdo & Kaul

[57] ABSTRACT

An apparatus for clamping a body to a support in which the body is provided with a slot through which the clamping member can extend includes a clamping member having a shaft with threads at one end and a T-head at the other end, a support having a recess in one face to receive the T-head and an opening through which the clamping member shaft extends and a threaded member coupled to the threaded end of the clamping member, the threaded member being rotatable to axially move the clamping member. A first drive motor is provided to rotate the threaded member to extend the clamping T-head beyond the surface of the support. A second drive motor is provided to rotate the clamping member to a clamping position and to a releasing position. A source of power such as fluid under pressure is provided, the motors being hydraulic. A control apparatus selectively controls the application of fluid pressure to the first and second drive motors to sequentially apply power to the second drive motor and then to the first drive motor when a body is being clamped to a support and to simultaneously to apply power to both of the first and second drive motors when the body is being released.

13 Claims, 6 Drawing Figures

ARRANGEMENT FOR THE ATTACHMENT OF A BODY TO A SUPPORT

This invention relates to an arrangement for releasably attaching a body to a support, particularly for use in attaching a part of a tool in a press.

In known press mechanisms of this type, there has been used a clamping device involving a hammerhead bolt which is swiveled by means of a positive connection between a nut and a screw portion of the bolt depending upon the rotational direction of the driving motor driving the nut, whereby the desired limit position of swiveling is determined by a mechanical stop. In order to avoid damage to the hammerhead of the bolt, the screw together with the nut must be shiftable in an axial direction, which shifting requires a complex development of the driving element of the nut, more complex than is necessary for its axial shifting on the basis of a change of position on the screw. In the case of an arrangement wherein the hammerhead lies beneath the screw, a spring is employed to hold the hammerhead in its lowest position while in the case of a screw with the hammerhead arranged on top, an operating cylinder is necessary for lifting it, in which case the screw is developed as a piston. A switch then responds to a certain swiveling position of the screw and another switch to a level of the screw. An apparatus of this general type is shown in U.S. Pat. No. 3,111,895.

The present invention is directed to the problem of providing a positive rotation of the screw for safe operation of the assembly. This problem is solved according to the invention by providing a rotating arrangement so that the desired position of rotation of the screw carrying the hammerhead can be determined unequivocally and does not depend upon irregularities which can occur as a result of variable friction in the thread connecting the screw to the nut, by fouling of the hammerhead or the body, or the like.

Briefly described, the present invention involves an improved apparatus for releasably attaching a body to a support, the improvement being employed in the environment of an apparatus of a type having a clamping member having a shaft with threads at one end and with a T-head or hammerhead at the other end, a support having a surface against which the body is to be clamped and having a recess in that surface thereof to receive the T-head, the support having an opening through which the clamping member shaft extends, the apparatus further having a nut threadedly engaging the threaded end of the clamping member, the nut being rotatable to axially move the clamping member, and first drive means to rotate the nut, whereby the T-head is extendable beyond the clamping surface of the support and is rotatable between clamping and releasing position. The improvement comprises rotation means engaging the shaft of the clamping member for rotating said member between its clamping and releasing positions; second drive means for driving the rotating means; a source of power for said first and second drive means; and control means for selectively controlling the application of power from said source to said first and second drive means to sequentially apply power to said second drive means and then to said first drive means when a body is being clamped to the support, and to simultaneously apply power to both of said first and second drive means when a body is being released. The invention also contemplates an apparatus in which the source of power is a source of fluid under pressure, the first driving means is a fluid operated rotary motor, the second drive means comprises a reciprocating piston and cylinder assembly having operating piston means connected to rotate the clamping member, and the control means includes a fluid conduit to supply fluid under pressure to the first driving means, the conduit being coupled to the operating piston means to supply fluid under pressure to the first driving means when the second driving means rotates the clamping member toward the clamping position.

In order that the manner in which the foregoing and other objects are attained in accordance with the invention can be understood in detail, particularly advantageous embodiments thereof will be described with reference to the accompanying drawings, which form a part of this specification, and wherein.

Figure 3:
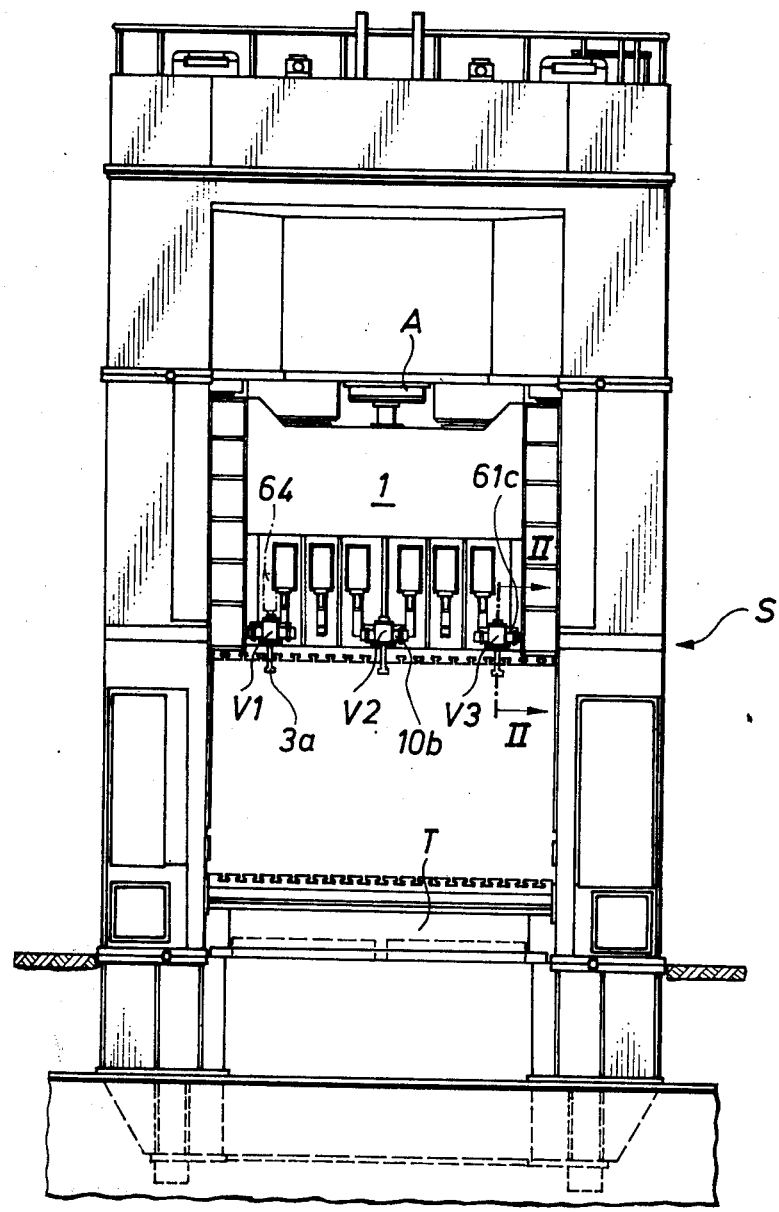
FIG. 3 is a simplified overall elevation of a press incorporating the improvement of the present invention.

As the clamping member of the present invention is primarily designed for use in conjunction with a press, it will be described in that context. A press of the general type, which is part of the prior art, is shown in FIG. 3. As shown therein, the press comprises a relatively massive annular or O-shaped closed frame S having a press table T and having a press ram 1 mounted in the frame. Ram 1 can be raised and lowered by operating a hydraulic operating cylinder A. Press ram 1 can be provided with, for example, six clamping assemblies and their controls V-1–V-6 of which three can be seen in FIG. 1. These clamping assemblies, constructed in accordance with the invention, are attached to the press ram and serve for the attachment of an upper tool or molded part to be carried with the press ram.

Press table T can be tensioned or clamped in fixed position by means of known locking devices, not shown, with the lower part of the press serving to receive a lower tool or molded part, not shown, to cooperate with the upper tool attached to the ram.

Figure 1:
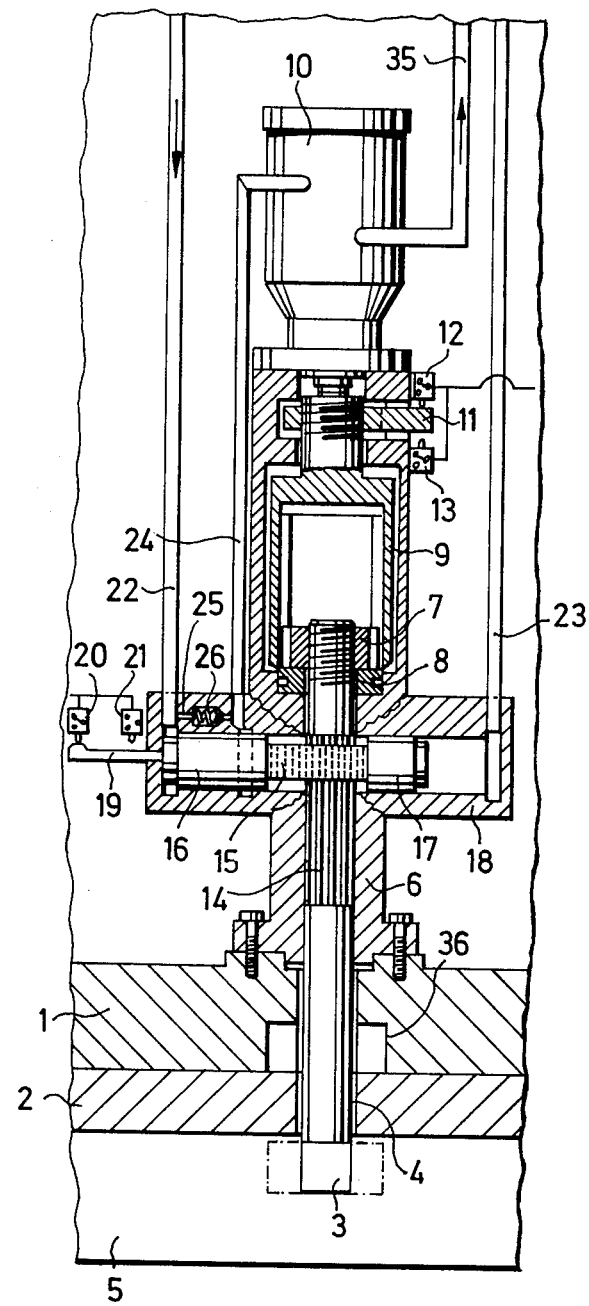
FIG. 1 is an elevation, in partial section, of a clamping member and operating mechanism in accordance with the invention.

The clamping apparatus of the present invention is more clearly shown in FIG. 1 wherein the lower portion of the press ram 1 is partly shown. An upper portion of the tool or mold 2 of a press tool is releasably attached to ram 1 by means of a T-head or hammerhead bolt 3. The head of the bolt is received in a groove 5 which is disposed on the side facing away from ram 1. The bolt passes through a bore 4 through which the T-head can pass if it is turned in the proper direction, as shown in solid lines in FIG. 1, but through which it cannot pass if the bolt is rotated 90° to a position indicated by phantom lines in FIG. 1. It will be recognized that if the T-head is rotated to the position shown in phantom lines and then axially drawn upwardly, part 2 of the mold or tool can be firmly clamped to press ram 1.

A relatively complex housing 6 is attached to press ram 1, the shaft of bolt 3 extending through a central bore of housing 6. On the end of the bolt opposite the T-head end the bolt is provided with external threads and an internally threaded nut 7 is screwed onto the end of the bolt with a pressure-sensitive annular member 8 encircling the shaft of the bolt and lying between nut 7 and an upwardly facing annular shoulder of housing 6. Pressure-sensitive member 8 can be, for example, a wire strain gauge, a pressure cell, or any similar device capable of producing a signal representative of compressive force between the nut 7 and the shoulder of housing 6. The output of member 8 can be part of a pressure meter and can be used for control of the apparatus to be hereinafter described.

Nut 7 is surrounded by an operating casing 9 which is generally cylindrical in shape and which has an interior shape which matches the external form of the nut, e.g., hexagonal. Casing 9 is axially somewhat longer than nut 7 so that it can receive the protruding threaded end of bolt 3 as the bolt extends through the nut, particularly when the T-head is withdrawn into recess 36 in the lower face of ram 1. Casing 9 is rotatable within a cavity within housing 6 and is fixedly attached to the output shaft of a first driving motor 10 which is preferably a fluid operated motor in the nature of a rotatable hydraulic motor. The output shaft of motor 10 is connected to casing 9 by an externally threaded portion on which is provided a registering nut 11. Nut 11 is non-circular in external configuration and a lateral extension of the nut protrudes through a relatively narrow opening in the side of housing 6, the limits of which prevent the nut from rotating. Thus, as the motor 10 and casing 9 rotate, the nut is prevented from rotating and rides up or down on the threads of the intermediate portion. The distal end of nut 11 is employed to engage one or the other of limit switches 12 or 13 at the upper and lower desired limits of motion of the nut, respectively. Switches 12 and 13 can be employed to control the application of fluid pressure to driving motor 10, as will be described.

A portion of the shaft of bolt 3 between the T-head and the threaded end is splined in a fashion which renders it effective as an axially elongated spur gear 14. The teeth of gear 14 engage the teeth of a rack 15 which is disposed within a cylinder jacket 18, which forms a part of housing 6, and which extends perpendicular to bolt 3. It will be apparent that gear 14 is made somewhat longer than the width of rack 15 so that the two will remain in engagement despite axial shifting of the bolt.

Rack 15 extends between, and is fixedly attached to, pistons 16 and 17 which lie within cylinder jacket 18 and are axially movable therein. Piston 16 carries an indicator bar 19 which extends axially away from the piston and through the end of cylinder 18 so that it can actuate one of a pair of limit switches 21 which are used to control the pressure supplied to motor 10 as will be described. Fluid pressure conduits 22 and 23 are connected to opposite ends of cylinder 18. A fluid conduit 24 is connected through cylinder 18 to a point near, but axially spaced from, conduit 22, the spacing between the openings to these conduits being selected so that piston 16 opens along line 24 only when the piston and rack assembly moves to the opposite end of cylinder 18, a position in which the hammerhead is rotated to the phantom line position as indicated in FIG. 1. A bypass conduit 25 is formed in the wall of cylinder 18 and extends between conduits 22 and 24. A non-return or unidirectional valve 26 is disposed in conduit 25, this valve being a spring biased ball valve or the like which is capable of conducting fluid only in the direction from conduit 24 to conduit 22. Conduit 24 is connected to one side of motor 10, the other side thereof being connected to a conduit 35.

Figure 2:
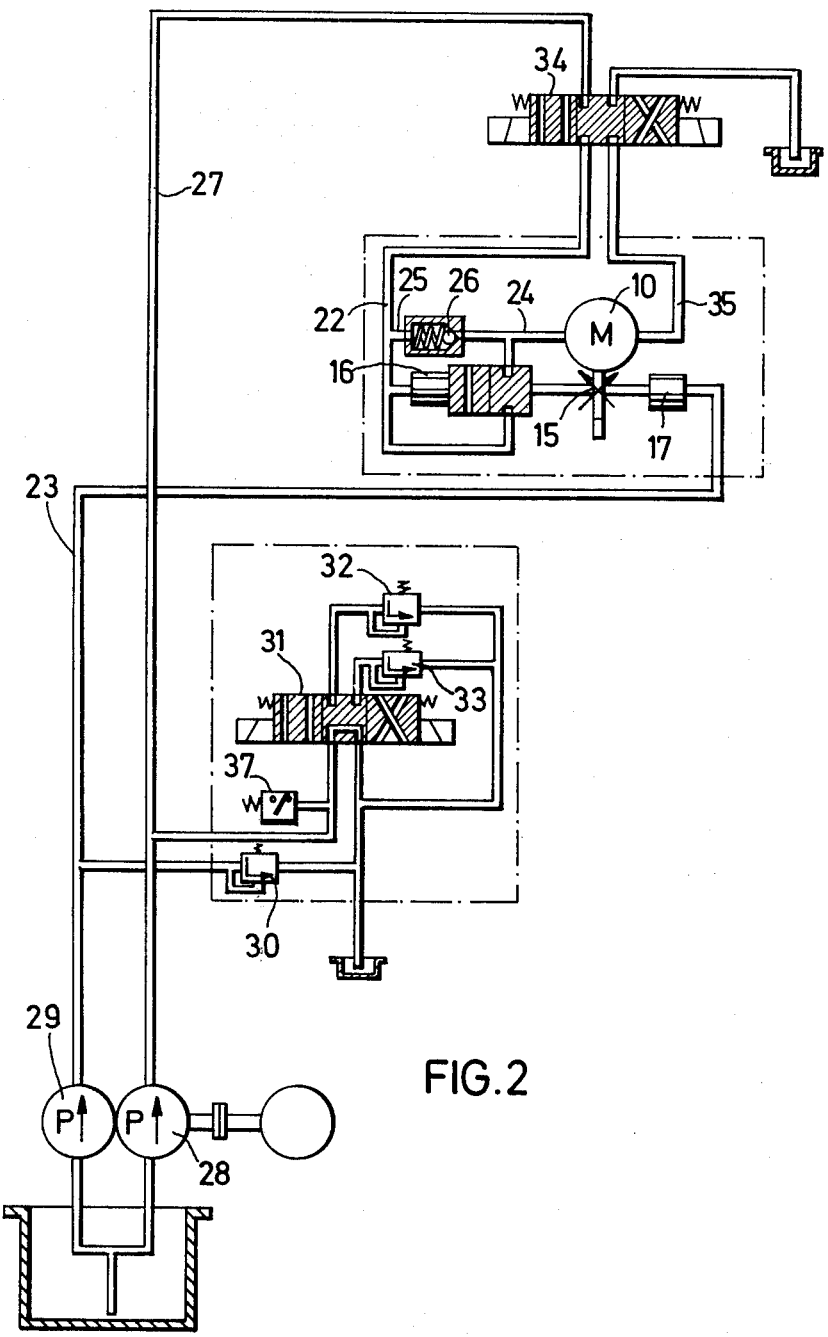
FIG. 2 is a schematic diagram showing fluid pressure supply and control means for the apparatus of FIG. 1.

As shown in FIG. 2, conduits 22 and 35 are connected to a three-position solenoid operated valve 34 which is connected through a conduit 27 to the pressure output side of a conveying pump 28. A conduit 23 is connected to the pressure output side of a conveying pump 29 and supplies pressure to piston 17 in cylinder 18 and also to an adjustable pressure limitation for regulating valve 30. Conduit 27 is also connected to a three-position solenoid operated valve 31 and, through that valve, to one of adjustable pressure regulating valves 32 or 33. The border or limiting pressure of pressure limitation valve 33 is the higher one of the two and the border pressure of valve 32 is lower. The border pressure can be controlled by means of an electric pressure switch 37. Because of the fact that a press generally has four of the previously described clamping arrangements, connection of four first driving motors 10, each by way of a valve such as valve 34 to line 27, and of four second driving motors such as the piston and cylinder assembly 16–18 to line 23, are provided. Several clamping devices can be connected with pumps 28 and 29 and control units including regulating devices 30–33 and 37 in series connection, so that the control can be expanded arbitrarily depending on the pressure or the path.

As previously indicated, FIG. 1 shows the piston position and and the T-head in solid lines in the open position of the apparatus in which the T-head bolt passes through but is not clamping mold part 2. In order to fixedly attach element 2 to press ram 1, pressure limitation valve 32 is connected by way of valve 31 with conduit 27, and valve 34 is operated so that line 22 is connected with pump 28. In this situation, pressure is supplied through conduit 22 to piston 16, causing pistons 16 and 17 and rack 15 to be shifted from the extreme left-hand terminal position shown in the drawing to the opposite right-hand position counter to the pressure prevailing in conduit 23 and limited by pressure regulating valve 30. Movement of rack 15 rotates the shaft and T-head of bolt 3 into the position shown in phantom lines in FIG. 1. After piston 16 has assumed its extreme right-hand position, line 22 is connected to line 24 through the left-hand portion of cylinder 18 and pressure is supplied to motor 10. Motor 10 then rotates, driving casing 9 which rotates nut 7 in a direction to axially withdraw the bolt upwardly so that the T-head of bolt 3 is pressed against part 2, clamping it to ram 1. The magnitude of the pressure force is detected by the pressure-sensitive member 8 which produced a signal which can be read on a meter or otherwise used for control purposes.

In order to release the clamp, valve 31 is moved so that valve 33 is connected to line 27 and valve 34 is moved so that line 35 is also connected to line 37. Fluid pressure is thus applied to line 35 to rotate motor 10 in the opposite direction, rotating the nut and releasing the clamping force. It will be observed that the pressure in line 27, as controlled by valve 33, is greater than the pressure in that line as controlled by valve 32. Thus, the power of the driving motor 10 during releasing of nut 7 is greater than the power during tightening of the nut.

The fluid under pressure flowing away from motor 10 passes through conduit 25 from conduit 24 to conduit 22, in the direction permitted by valve 26, to a reservoir, valve 34 being in the extreme left position (FIG. 2). During the release of nut 7 by motor 10, and because of the constant pressure on the right-hand face of piston 17, the piston and rack assembly is shifted to the left, returning it to the position as shown in FIG. 1 with the T-head rotated to its release position. Part 2 can now be removed from ram 1.

In order to retract the T-head of hammerhead bolt 3 into recess 36, line 27 is connected by way of valve 31 with pressure limitation valve 32 and by way of valve 34 with conduit 22 so that the head of the bolt is rotated into the position shown by the phantom lines. In this operation it will be observed that the actual distance between limit switches 12 and 13 would be greater than that actually shown in FIG. 1, the actual distance being dependent upon the threads of the threaded portion of casing 9 and nut 11, and the distance of travel required for the nut. After piston 16 has moved enough to open the end of conduit 24, the bolt is raised by rotation of motor 10 and casing 9 until the T-head lies in recess 36. Switch 12 in this case can be adjusted so that nut 11 contacts switch 12 and actuates it before the bolt is pressed too firmly against the interior's upper surface of the recess. The recess is formed so that it can house the T-head regardless of its rotational position. Thus, the recess can be circular or at least a part of a circle. In the process of lowering the bolt into the position shown in FIG. 1, the bolt is swiveled at the beginning of the process or immediately after the lowering movement into the swivel position shown in solid lines. The tensioning force of bolt 3 for holding molding part 2 on press ram 1 can be monitored directly with the aid of pressure-sensitive member 8. The torque transmitted from first driving motor 10 to the nut 7 is greater during release of the nut than it is during the tensioning process. The development of this assembly has been made in such a way that the T-head of the hammerhead bolt 3 will necessarily be in its tensioning position before part 2 has been clamped firmly to press ram 1. The pull of the hammerhead bolt 3 can be adjusted by the position of registering nut 11 in relation to housing 6 and to limit switches 12 and 13.

Figure 4:
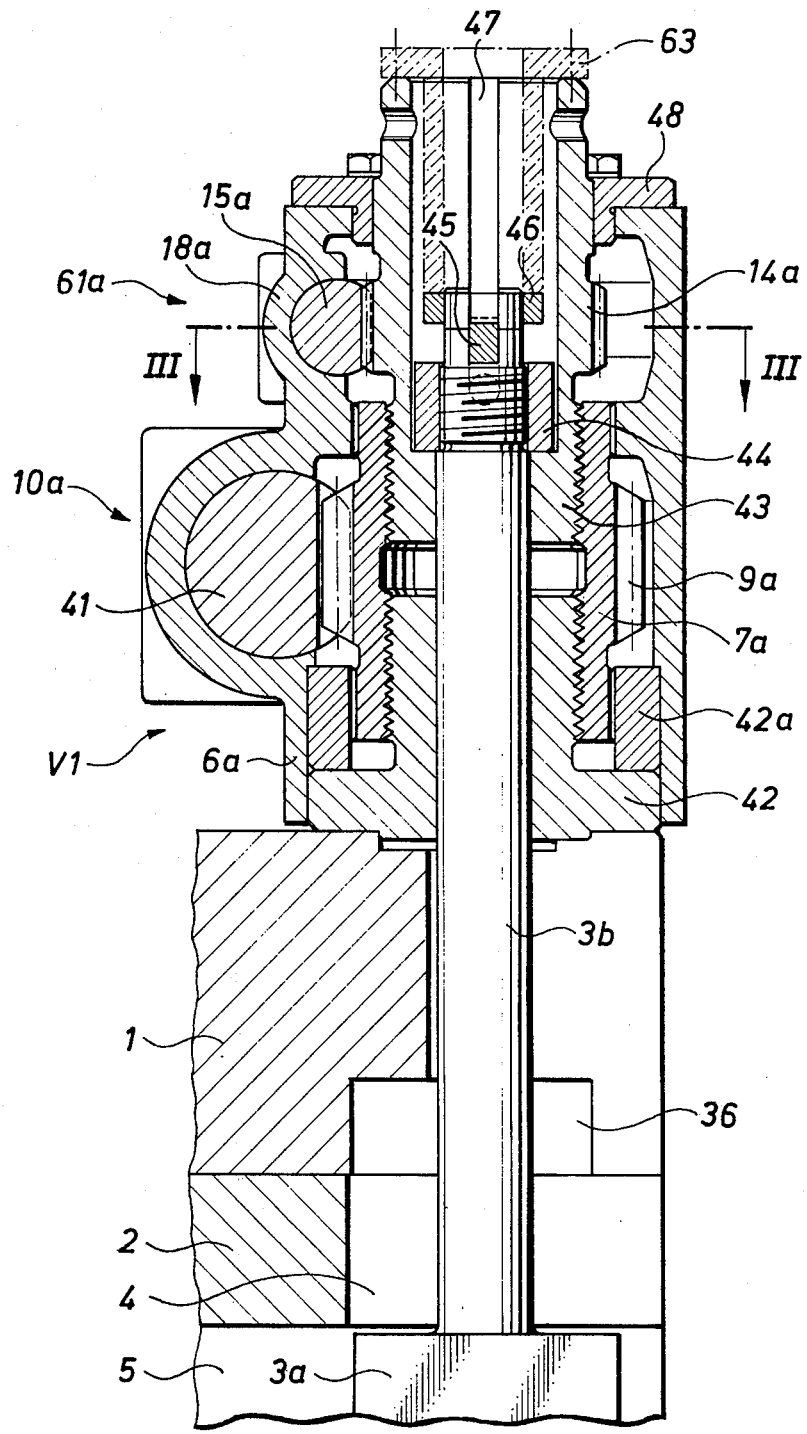
FIG. 4 is a side elevation, in partial section, of a further embodiment of the invention along lines II—II of FIG. 3.
Figure 5:
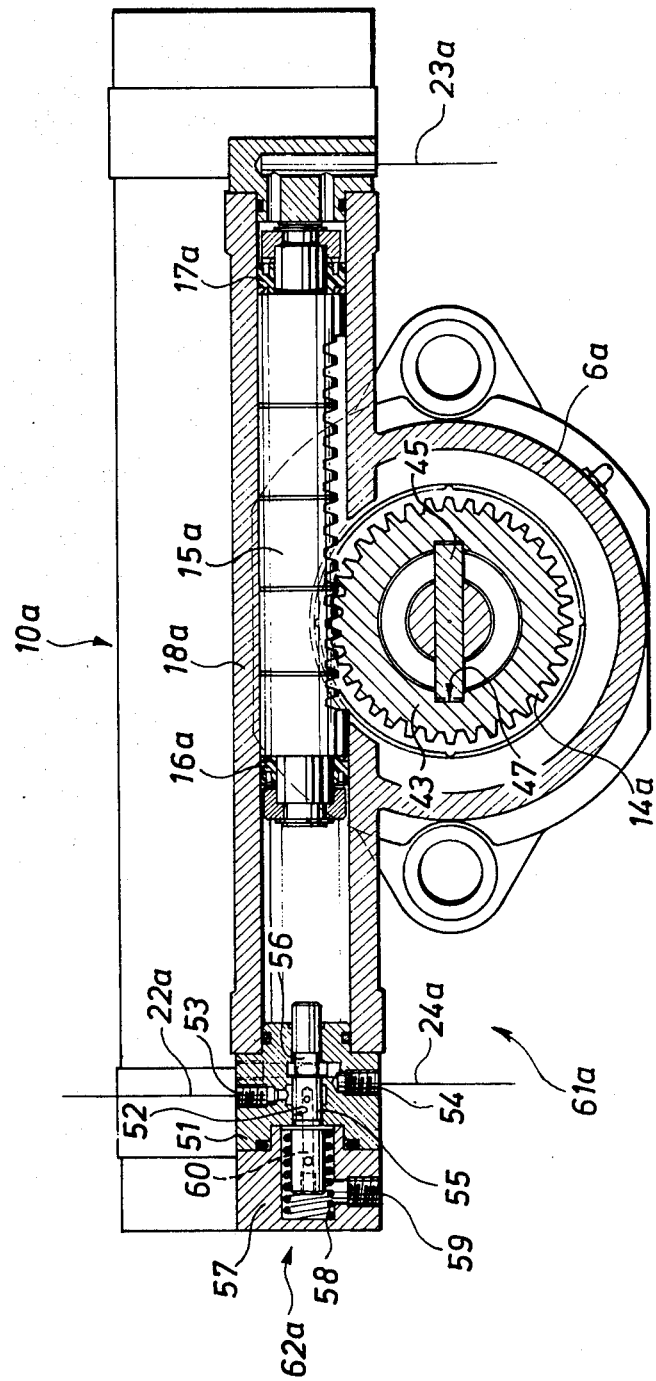
FIG. 5 is a plan view, in partial section along lines III—III of FIG. 4.
Figure 6:
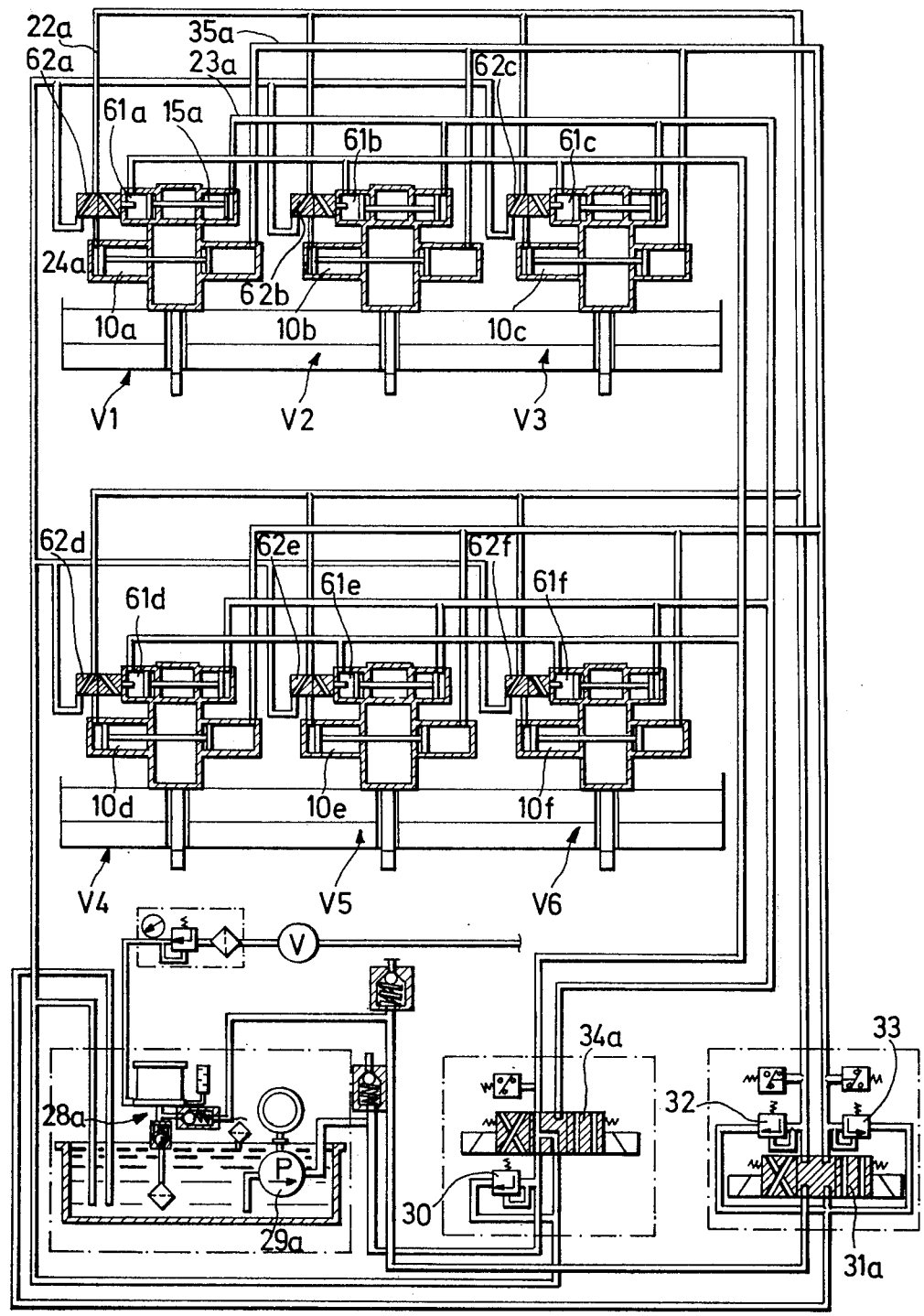
FIG. 6 is a schematic diagram of a fluid pressure system used for controlling a plurality of clamping members in accordance with the invention.

A further embodiment of a system according to the invention is shown in FIGS. 4–6, this embodiment operating on the same basic principles as shown with reference to FIGS. 1–3 and being usable in the press of FIG. 3 as previously indicated. A plurality of attaching devices to connect a tool to a ram head are illustrated. Because all of the attaching devices are substantially identical, a detailed description of only one of them will be sufficient. As shown in FIGS. 4 and 5, an upper tool or molded part 2 of a press tool is releasably attached to a press ram 1 by means of a hammerhead bolt having a T-head 3a formed on one end of a shaft 3b. As previously described with reference to the embodiment of FIGS. 1 and 2, the T-head lies in a groove 5 disposed on the side of part 2 which faces away from the press ram 1, the bolt passing through a recess or opening 4 which is penetrated by the shaft of the bolt. The T-head can be rotated by an angle of 90° in groove 5. When rotated to its engaging position, the molded part 2 can be firmly attached to ram 1.

As shown in FIG. 4, a housing 6a is attached to press ram 1, in which housing the hammerhead bolt is mounted for axial and rotating movement. The shaft 3b of the hammerhead bolt is surrounded by a bushing 7a which is internally threaded and which has gear teeth 9a formed on its exterior surface. Bushing 7a is rotatable in housing 6a and gear teeth 9a mesh with a toothed rack 41 which is driven by a first driving motor 10a. The motor includes a cylinder jacket and end pistons and the construction thereof corresponds generally to the arrangement of the axially slidable motor shown in FIG. 1 and also to the general arrangement of components to be discussed in connection with motor 61a which is shown in FIG. 5.

As shown in FIG. 4, housing 6a surrounds and retains a fixedly attached screw member 42 which is provided with a radially outwardly extending flange in contact with the housing and press ram 1. The shaft 3b of the hammerhead bolt passes through screw member 42. Between the flange of hollow screw 42 and a downwardly facing inwardly extending shoulder on the inner surface of housing 6a is a bearing ring 42a which serves for the mounting of the lower part of a threaded bushing 7a, the upper part of which is mounted in housing 6a. The flange of the hollow screw 42 and the bearing ring 42a are clamped between the shoulder on the inner surface of the housing 6a and the press ram 1. For this purpose the housing 6a is located at a small distance from the press ram 1. Bushing 7a is internally threaded in two parts, the lower portion being internally threaded in one direction and the upper portion being threaded in the opposite direction. A rotatable hollow screw member 43 is screwed into the upper threaded portion of bushing 7a, shaft 3b extending through and into screw 43. The external threads on screws 42 and 43 are of the same pitch but the threads thereon are in opposite directions, e.g., left-hand or right-hand threads. It is also possible to provide different pitches on the threads of screws 42 and 43 and the mating portions of bushing 7a. A retaining nut 44 is screwed onto the threaded end of shaft 3b opposite the hammerhead 3a, which nut is supported on an upwardly facing internal shoulder on the turnable hollow screw 43. A slit extends downwardly into the end of shaft 3b and receives a guidepiece 45 which is rectangular in cross-section and which is retained in the slit in the end of shaft 3b by a retaining ring 46, which is, itself, held on the end of shaft 3b by a crossbolt or pin, not shown. The ends of guidepiece 45 project through grooves 47 in hollow screw 43, screw 43 extending beyond the end of shaft 3b in the released position illustrated in FIG. 4. Screw 43 is mounted at the upper end of housing 6a by means of a bearing ring 48 which is secured to the end of housing 6a. The housing is filled with lubricating grease and openings for the passage of the lubricating grease to the bearing places inside housing 6a are provided. Rotatable screw 43 is provided on its exterior surface with gear teeth 14a which mesh with the teeth of a toothed rack 15a which is a component of a second driving motor 61a, shown in FIG. 5.

As shown in FIG. 5, motor 61a includes pistons 16a and 17a which are located on either end of, and fixedly attached to, rack 15a, the entire assembly being movable axially in a cylinder jacket 18a which has at its ends connections to fluid pressure lines, the connection line 23a being shown. The cylinder jacket 18a is a component of and is integrally formed with housing 6a.

At the left end of cylinder jacket 18a as shown in FIG. 5, a valve 62a is shown. A central bore 52 in a valve housing 51 is connected to fluid pressure connections 53 and 54 by way of annular grooves which are axially spaced apart from each other. Bore 52 is connected at the end farthest from the cylinder jacket to a fluid pressure connection 59. A valve slide 55 is mounted in bore 52 for axial movement. Valve slide 55, in the position shown in FIG. 5, separates the two connections 53 and 54 from each other but permits fluid flow between connections 53 and 59. In the position in which the valve slide is shifted to its left position the two connections 53 and 54 communicate with each other through a constricted part 56 of the slide and through an annular groove, while connections 53 and 59 are separated from each other. In the rest position shown, one end of valve slide 59 projects into the volume defined by cylinder jacket 18a. A spring 58 housed in valve cover 57 urges the valve slide toward the position shown. The space in which spring 58 is housed contains the connection 59 leading to outside conduits. Valve slide 55 is provided with a central bore 60 which, in the position shown in FIG. 5, extends from the area of connection 53 into the space housing the spring to permit communication between the connections previously mentioned.

In the position of slide 55 as shown, fluid under pressure delivered to connection 53 can flow through central bore 60 to connection 59. If the valve slide is shifted to its left-hand position so that connections 53 and 54 communicate with each other and the central bore is covered by valve housing 51, then the fluid under pressure delivered to connection 53 passes to connection 54.

When the motor 61a is operated to shift the toothed rack from the right to the left, as shown in FIG. 5, which is equivalent to moving the rack 15a out of the paper in FIG. 4, hammerhead 3a is swiveled into a position in which it cannot enter into recess 4, thus preventing removal of the tool or molded part 2 from press ram 1. During this swiveling, hollow screw 43 is rotated simultaneously with locally fixed hollow screw 42 so that the hammerhead 3a is pulled in a direction toward press ram 1 so that the travel of the hammerhead is limited to an amount which will just still permit the swiveling of hammerhead 3a. As soon as the hammerhead is swiveled, connections 53 and 54, which previously had been separated from one another, are connected as a result of the contact of piston 16 with valve slide 55, and previously interconnected connections 53 and 59 are separated from one another, so that fluid under pressure can flow from connection 53 to connection 54 which is connected with the end of the cylinder jacket of the first driving motor 10a by way of a conduit 24a (FIG. 6). As soon as fluid under pressure flows into driving motor 10a, toothed rack 41 is shifted, rotating threaded bushing 7a in a clockwise direction as viewed from below. Bushing 7a thus rotates upwardly on the left-hand threads interengaging members 7a and 42 so that screw 43 is carried upwardly by that movement. At the same time, screw 43 is prevented from rotating because of the interengagement between teeth 14a and the teeth on rack 15a. Because of the opposed relationship of the threads between members 7a and 43, screw 43 is also moved upwardly by this interengagement, causing screw 43 to move double the distance, i.e., twice the thread pitch, as the movement between 7a and 42. The hammerhead is thus brought into engagement with member 2, clamping it firmly against ram 1. For a safe holding of the part 2 on ram 1, it is necessary that rack 41 not be shifted completely to its opposite extreme position, but remains spaced from the end of the cylinder in which it is contained. The threads between the elements are self-locking, maintaining the components in their new position.

In order to release hammerhead 3a, the hydraulic circuit including connections 53 and 54 is relieved and the piston part disposed on the opposite side of rack 41 is acted upon by fluid under pressure, causing rack 41 to move back toward its starting position. After moving of rack 15a in motor 61a back to its original position, slide 55 is again shifted by spring 58 into the position shown in FIG. 5 and connection 53 is again in communication with vent connection 59 by way of central bore 60 of slide 55.

In FIG. 6 is shown a schematic diagram of the hydraulic circuits for six attaching devices V1 to V6 which are constructed in accordance with the previously described embodiment given by way of example. A high pressure circuit is provided with a high pressure pump 28a and a low pressure circuit with a low pressure pump 29a. The pumps and their drives are conventional and will not be described in detail. A compressed air motor fed from a compressed air network, which is automatically controlled as schematically illustrated, serves for the drive of high pressure pump 28a. First driving motors 10a–10f are connected by way of a four path three position valve 31a with the high pressure pump 28a and the second driving motors 61a to 61f are connected by way of a four path three position valve 34a with the low pressure pump 29a. A line 22a of the high pressure circuit is connected with the connection 53 of valve 62a shown in FIG. 5 and is connected at the same time with valves 62b–62f. Connection 54 is connected through a conduit 24a with the first driving motor 10a.

An adjustable pressure limiting valve 30 is provided in the low pressure circuit before valve 34a, which pressure limiting valve can be adjusted to pressures in the order of 40 bar to 60 bar, respectively. An adjustable pressure limiting valve 32 for clamping the hammerhead bolt is located in the high pressure circuit and a pressure limiting valve 33, which can be adjusted to a somewhat higher pressure in order to release the hammerhead clamp. These adjustable pressures are on the order of 100–110 bar.

When the hammerhead bolt is released, the parts previously described are in the positions as shown. Whenever the tool or molded part 2 is disposed in its intended position on press ram 1, the hammerheads 3a of the arrangements V1 to V6 are swiveled as a result of the operation of valve 34a, as a result of which valves 62a to 62f are operated. Whenever one of the hammerheads 3a of the arrangements V1 to V6 is not swiveled, then the associated valves 62a–62f are not operated either and any fluid under pressure possibly delivered by way of valve 31a can be vented without pressure to the supply tank by one of valves 62a–62f. As a result of this, it is insured that none of the hammerhead bolts 3a can be placed under tension until all have assumed their provided for swiveling position. If that were not the case, then fluid under pressure delivered by way of valve 31a could enter into the first driving motors 10a–10f, as a result of which these motors would be operated and the hammerheads would be tightened.

In order to release the hammerheads 3a, in which a higher pressure is selected in the high pressure circuit and was used in the clamping operation, fluid under pressure is fed to the opposite side of the first driving motors 10a–10f, as a result of which the tension on the hammerheads is slackened. Subsequent to this, the two driving motors are always acted upon on their opposite sides, as a result of which the hammerheads 3a swivel back into their starting positions.

The high pressure circuit and the low pressure circuit are separated from each other for the purpose of safety. Whenever valve 31a is operated before the hammerheads have been swiveled into their tension position then, because of the open paths through valves 61a–61f, no pressure can build up in the high pressure circuit. Whenever hammerheads 3a are under tension, and first driving motors 10a–10f are under pressure from the fluid under pressure on the side serving for the tensioning of the hammerheads, then an accidental operation of valve 34a for the purpose of swiveling back the hammerheads would do no harm, since the second driving motors 61a–61f cannot become operative because of the friction occurring between hammerheads 3a and the tool or molding part 2. The pressure in the low pressure circuit is not sufficiently high to cause any damage under these circumstances.

In the case of a removed tool or molding part 2, hammerheads 3a can be retracted into a recess 36 (FIG. 4). Whenever the previously described arrangement is used in the case of a lower tool or molding part, then hammerhead 3a is prevented from resting on the lower tool or molding part, or on the press table T as a result of the attachment of a spacing bushing 63 shown in phantom lines in FIG. 4, which bushing is attached to hollow screw 43 and which rests on supporting ring 46. Whenever a limited movement of hammerhead 3a with respect to hollow screw 43 is to be possible, there is provided a spring clamped between a holding disc, not shown, and attached to the free end of hollow screw 43, holding ring 46 then replacing the spacing bushing 63. By limiting the path of the hammerhead 3a with respect to the hollow screw 43, or by fixing the hammerhead 3a with respect to said hollow screw, in the case of a lower device attached in reverse as compared to the above arrangements V1–V6, one will prevent the hammerhead 3a from moving at all, or moving beyond a certain point with respect to the hollow screw 43, and because of its actual weight, from resting on the lower tool or molding part or on the press table T.

It is also possible to remove the spacing bushing 63 from hollow screw 43 and to move the hammerhead 3a axially by means of a hydraulic or pneumatic operating cylinder 64 shown in FIG. 3 in phantom lines by means of a corresponding control device. With the aid of the operating cylinder, hammerhead 3a can be shifted on an extended path, longer than it could be shifted with the aid of hollow screw 43, and it can assume a rest position, such as in recess 36, not extending beyond the press table T. This has the advantage that the lower tool or molding part to be attached to table T can be put on the table without there being any need for taking into consideration any projecting hammerheads 3a.

The axis of the tensioning hammerhead 3a and of its shaft 3b can be disposed horizontally or on some inclined angle in addition to being vertical, whereby the various components associated therewith, as previously described, assume a corresponding position.

While certain advantageous embodiments have been chosen to illustrate the invention, it will be understood by those skilled in the art that various changes and modifications can be made therein without departing from the scope of the invention as defined in the appended claims.

What is claimed is:
1. An improved apparatus for releasably attaching a body to a support, the apparatus comprising
   a clamping member having a shaft with threads at one end and with a T-head at the other end,
   a support having a recess in one face thereof to receive the T-head and an opening through which the clamping member shaft extends,
   threaded means coupled to the clamping member, the said threaded means being rotatable to axially move the clamping member, and first drive means to rotate said threaded means, whereby the T-head is extendable beyond a surface of the support and is rotatable between clamping and releasing positions,
   rotating means coupled to said shaft of said clamping member for rotating said member between its clamping and releasing position;
   second drive means for driving said rotating means;
   a source of power for said first and second drive means; and
   control means for selectively controlling the application of power from said source to said first and second drive means to sequentially apply power to said second drive means and then to said first drive means when a body is being clamped to the support, and to simultaneously apply power to both of said first and second drive means when a body is being released.
2. An apparatus according to claim 1 wherein
said source of power is a source of fluid under pressure;
said first driving means is a fluid operated motor;
said second driving means comprises a double action operating piston and cylinder assembly having operating piston means connected to rotate said clamping member; and
said control means includes a fluid conduit supply fluid under pressure to said first driving means, said conduit being coupled to
said operating piston means to
supply fluid under pressure to
said first driving means when
said second driving means rotates
said clamping member toward said clamping position.
3. An apparatus according to claim 2 wherein
a portion of said control means includes part of said cylinder of said second driving means including means defining first and second openings spaced apart in the direction of motion of said operating piston means,
said control means further comprising means defining a bypass conduit connected in parallel with said part of said cylinder, and
a unidirectional valve in said bypass conduit to permit fluid flow away from said first driving means.
4. An apparatus according to claim 3 wherein
the shaft of said clamping member includes means defining spur gear teeth on the outer surface thereof;
and wherein said operating piston means includes first and second pistons in said cylinder, said pistons being axially spaced apart;
a toothed rack attached to and extending between said pistons, the teeth of said rack being in meshing relationship with said teeth on said shaft, said pis- tons and said rack being movable between two extreme positions, said first and second openings being spaced apart so that one of said first and second pistons closes at least one of said openings in one extreme position and opens both of said openings in the other extreme position.

5. An apparatus according to claim 1 wherein
said source of power is a source of fluid under pressure, and
said first and second drive means are fluid operated motors;
and wherein said control means further comprises pressure regulating means for regulating the pressure of fluid supplied from said source to both of said motors at a first pressure $P_1$ during clamping, to said second motor at said pressure $P_1$ during releasing, and to said first motor at a second pressure $P_2$ during releasing, where $P_1 < P_2$.

6. An apparatus according to claim 1 wherein said control means further comprises
pressure-sensitive means disposed between said nut and said T-head for producing an electrical signal representative of clamping force.

7. An apparatus according to claim 1 wherein
said source of power includes at least one source of fluid under pressure,
said first and second drive means includes first and second fluid pressure-operated motors, respectively, and
said control means includes separate fluid circuits for said first and second motors,
the fluid circuit for said first motor including a two-position valve between said source of fluid and said first motor, said valve being actuated by said second motor to close a fluid path between said source and a reservoir and to open a path between said motor and said source when said rotating means has moved said T-head to its clamping position.

8. An apparatus according to claim 7 wherein said apparatus includes a plurality of clamping members, and wherein the two-position valves for all of said members are connected in a joint liquid circuit and are moved in parallel therein.

9. An apparatus according to claim 7 wherein
said fluid circuit for said first motor is a relatively high pressure circuit and the circuit for said second motor is a relatively low pressure circuit.

10. An apparatus according to claim 7 wherein said second motor comprises:
a cylinder; and
a piston axially slidable in said cylinder;
and wherein said valve comprises:
an axially slidable valve member extending into said cylinder and movable between a first position by contact with said piston and a second position when not in contact with said piston; and
a spring urging said valve member toward said second position in which the path between said fluid pressure source and said reservoir is open and in which the path between said source and said first motor is closed.

11. An apparatus according to claim 7 wherein
said rotating means includes a hollow screw surrounding said shaft of said clamping member,
means for interconnecting said hollow screw and said shaft to permit axial relative movement therebetween and to prevent relative rotational movement,
means for directly connecting said second motor to said hollow screw,
and wherein said threaded means comprises a hollow bushing,
means for directly coupling said first motor to said hollow bushing,
said bushing having first and second sets of internal threads of opposite direction, one of said sets of threads engaging said hollow screw, and
a fixed hollow screw engaging the other of said sets of threads.

12. An apparatus according to claim 11 and further comprising
a spacing member connected to said hollow screw for limiting the axial movement of said clamping member.

13. An apparatus according to claim 7 and further comprising a fluid operated piston and cylinder assembly for axially shifting said clamping member.

* * * * *